(12) United States Patent
Lawandy

(10) Patent No.: US 6,874,639 B2
(45) Date of Patent: Apr. 5, 2005

(54) METHODS AND APPARATUS EMPLOYING MULTI-SPECTRAL IMAGING FOR THE REMOTE IDENTIFICATION AND SORTING OF OBJECTS

(75) Inventor: Nabil M. Lawandy, North Kingstown, RI (US)

(73) Assignee: Spectra Systems Corporation, Providence, RI (US)

( * ) Notice: Subject to any disclaimer, the term of this patent is extended or adjusted under 35 U.S.C. 154(b) by 77 days.

(21) Appl. No.: 10/241,271

(22) Filed: Sep. 10, 2002

(65) Prior Publication Data

US 2003/0006170 A1 Jan. 9, 2003

Related U.S. Application Data

(60) Continuation-in-part of application No. 10/057,231, filed on Jan. 25, 2002, now Pat. No. 6,578,712, which is a division of application No. 09/726,950, filed on Nov. 30, 2000, now Pat. No. 6,488,155, which is a division of application No. 09/379,062, filed on Aug. 23, 1999, now Pat. No. 6,296,189.

(51) Int. Cl.[7] .............................. B07C 5/00; G06K 7/10
(52) U.S. Cl. ........................ 209/3.3; 209/578; 235/491
(58) Field of Search ............................ 209/3.3, 3, 546, 209/547, 576, 577, 578, 580, 581, 582, 583, 584; 250/559.01; 382/111, 112; 356/51, 71; 235/435, 460, 461, 462.04, 469, 491

(56) References Cited

U.S. PATENT DOCUMENTS

| | | | |
|---|---|---|---|
| 3,513,320 A | | 5/1970 | Weldon ........................ 250/219 |
| 3,576,428 A | * | 4/1971 | Kapsambelis et al. ....... 235/454 |
| 3,812,325 A | | 5/1974 | Schmidt ....................... 235/454 |
| 3,902,047 A | | 8/1975 | Tyler et al. ............... 235/61.11 |
| 4,044,227 A | | 8/1977 | Holm et al. ................ 235/61.7 |

(Continued)

FOREIGN PATENT DOCUMENTS

| | | |
|---|---|---|
| DE | 4026546 A1 | 2/1991 |
| EP | 0509280 A2 | 10/1992 |
| EP | 578859 A1 | 1/1994 |
| GB | 2095822 A | 10/1982 |

OTHER PUBLICATIONS

Izmallov et al., "Generation of Stimulated Noncoherent Radiation in Light–Scattering Media Exhibiting Chemical Reactions," Institute of Semiconductors, Academy of Sciences of the Ukrainian SSR, Kiev, Apr. 12, 1981, pp 588–594.

(Continued)

Primary Examiner—Donald P. Walsh
Assistant Examiner—Mark Beauchaine
(74) Attorney, Agent, or Firm—Harrington & Smith, LLP

(57) ABSTRACT

A marking system for use with a multi-spectral imager for use in high throughput sortation of articles having distorted or irregular surfaces is disclosed. Specific uses include, but are not limited to, document sorting, garment and textile rental operations, laundry operations, and mail and package sorting and identification. Methods and apparatus are provided to remotely identify items via information that is wavelength-encoded within an applied mark, as well as a mark reading/decoding scheme. In the preferred embodiment the marks are multi-dimensional. In one preferred embodiment the marks are used to realize multi-dimensional wavelength-enabled coding schemes. The marks can be overlayed one upon another and/or they can contain one or more key regions having at least one predetermined spectral characteristic for providing information related at least to reading and/or decoding the marks.

36 Claims, 11 Drawing Sheets

U.S. PATENT DOCUMENTS

| | | | |
|---|---|---|---|
| 4,757,188 A | * 7/1988 | Nakarai et al. | 235/454 |
| 4,924,088 A | 5/1990 | Carman et al. | 250/271 |
| 5,128,528 A | 7/1992 | Heninger | 235/470 |
| 5,301,809 A | 4/1994 | Skinner | 209/937 X |
| 5,448,582 A | 9/1995 | Lawandy | 372/42 |
| 5,576,528 A | * 11/1996 | Chew et al. | 235/469 |
| 5,881,886 A | 3/1999 | Lawandy | 209/3.3 |
| 5,920,056 A | 7/1999 | Bonnet | 235/383 |
| 6,006,991 A | * 12/1999 | Faklis et al. | 235/462.06 |
| 6,119,943 A | * 9/2000 | Christy | 235/468 |
| 6,123,263 A | 9/2000 | Feng | 235/462.42 |
| 6,296,189 B1 | 10/2001 | Lawandy et al. | 235/491 |
| 6,354,502 B1 | * 3/2002 | Hagstrom et al. | 235/462.04 |

OTHER PUBLICATIONS

V.S. Letokhov, "Generation of Light by a Scattering Medium with Negative Resonance Absorption," Soviet Physics JetP, vol. 26, No. 4, Apr. 1968.

* cited by examiner

METHODS AND APPARATUS EMPLOYING MULTI-SPECTRAL IMAGING FOR THE REMOTE IDENTIFICATION AND SORTING OF OBJECTS

CLAIM OF PRIORITY FROM PRIOR PATENT APPLICATION

This patent application is a Continuation-In-Part of and claims priority from U.S. patent application Ser. No. 10/057,231 filed Jan. 25, 2002, now U.S. Pat. No. 6,598,112 which is a Divisional Application of U.S. patent application Ser. No. 09/726,950 filed Nov. 30, 2000, now U.S. Pat. No. 6,488,155 which is in turn a Divisional Application of U.S. patent application Ser. No. 09/379,062 filed Aug. 23, 1999, and now issued as U.S. Pat. No. 6,296,189 B1 on Oct. 2, 2001, the disclosure of which is incorporated by reference herein in its entirety.

FIELD OF THE INVENTION

This invention relates to systems and methods for marking and coding objects and, more particularly, to systems and methods for optically coding objects.

BACKGROUND OF THE INVENTION

A class of industrial problems exists in which a large number of items must be separated, identified, counted and sorted. One example occurs in the textile service industry, wherein soiled garments or linens are returned in large unsorted groups for cleaning and sorting. Present day means for solving this problem cover a broad spectrum. One solution uses manual workers who sequentially sort among the many items, picking single items manually and identifying the items visually. This solution is unsatisfactory because it is both slow and expensive due to the high reliance on manual labor.

There are numerous coding and sorting systems presently available. Many of these industrial problems are not overcome by present systems, such as those employing bar codes or radio frequency identification (RFID). For example, a particularly challenging problem is the sorting of goods which are flexible and therefore may easily distort or shield a code. These items, which range in size from very small to large, are typically presented in distorted orientations and may undergo severe use cycles that can easily damage identification tags.

In addition, bar codes are highly susceptible to degradation through both soiling and wear. Furthermore, due to the precise spatial information required for a bar code (line width and spacing), any warping of the label (almost assured on a fabric substrate) can result in reading rates that are characterized by high rates of error. Finally, bar codes require line-of-sight and (generally) a specific orientation with respect to the detector, both of which are difficult conditions to satisfy under typical large scale laundry conditions.

In contrast, the radio-frequency ID technique does not suffer from the line of sight and soiling problems associated with bar codes. However, RFID remains expensive, both from initial cost and associated maintenance costs, and therefore is normally not economical for the rental textile industry. Furthermore, RFID tags have a tendency to exhibit cross-talk when they are in proximity to one another, which can preclude their use on closely-spaced sorting conveyors.

These are just some of the technological barriers to accurate machine identification and automated counting and sorting. The lack of a viable coding and sorting solutions has resulted in high labor costs, lack of stock control, and reduced profits.

In spite of these disadvantages, these technologies have provided significant benefit to certain applications. Such advances have been witnessed in applications where certain steps have been a rate determining factor. For example, the use of bar codes and RFID has provided for increased speed of identification in high speed coding and sorting systems.

Accordingly, many technologies have arisen to address certain aspects of high throughput coding and sorting applications. Many of the systems presently available rely upon optical properties.

One example is an indicia reader disclosed in U.S. Pat. No. 5,920,056 "Optically-Guided Indicia Reader System for Assisting in Positioning a Parcel on a Conveyor," Bonnet, issued Jul. 6, 1999. The system disclosed in this patent is limited, however, in that it fails to account for imaging of indicia having an appearance that may be distorted, such as by the wrinkling of the substrate.

Another patent that provides for remote identification of objects is U.S. Pat. No. 3,902,047 "Label Reader with Rotatable Television Scan" Tyler et al., issued Aug. 26, 1975. This system provides for rotation of the orientation of an optically read label by electronic means. However, as with the previous patent, it fails to account for imaging of indicia having an appearance that may be distorted, such as by the wrinkling of the substrate.

Another aspect of coding is presented in the U.S. Pat. No. 3,513,320 "Article Identification System Detecting Plurality of Colors Disposed on Article" Weldon, May 19, 1970. Weldon discloses encoding a number, where various code hues (wavelengths) in a single patch provide a unique signal. Coded signals in a series of patches provide for a message. Weldon further discloses the use of control patches, such as a central spot, that emits only one control hue (wavelength), for providing control of sensors used in readout tasks such as governing positioning of a readout system for addressing indicia comprising successively enclosing zones. As Weldon calls for use in some embodiments of a varied number of hues in each patch, the system may experience decoding problems in some applications, for example, where irregular patch geometries are presented. Accordingly, Weldon appears to require accurately and uniformly pre-positioning the patches on the object; and, in another embodiment, accurate control of the orientation of the substrate to provide for successful imaging (see, for example, the embodiment of FIG. 2a, where a series of parallel narrow areas of varying code hues may comprise a colorant having one or more code hues contained therein). Furthermore, Weldon does not provide for implementation of many existing code schemes, such as bar codes, which incorporate elements having varied features (e.g. size and width), some of the bar codes themselves requiring further improvement.

Thus, a technique that provides for a machine readable marking, where the marking may appear in an irregular or distorted form is needed. Preferably, the technology should offer the ease of use and the low cost associated with bar codes, and yet be more robust and tolerant of harsh or high throughput environments, such as large scale document and package handling facilities.

In U.S. Pat. No. : 5,881,886 "Optically-Based Methods and Apparatus for Sorting Garments and Other Textiles" one of the inventors of this patent application has described various methods and apparatus that also address the problems referred to above.

SUMMARY OF THE INVENTION

The foregoing and other problems are overcome by methods and apparatus in accordance with embodiments of this invention.

The teachings of this invention provide embodiments of a multi-spectral imager and the application of same for the marking and coding of, for example, textiles, linens, garments, documents and packages for high-speed machine identification and sortation. Specific uses include, but are not limited to, garment and textile rental operations, laundry operations, postal and mail sorting of documents and packages.

The teachings of this invention are directed towards providing methods and apparatus that are used to identify items via information encoded within an applied mark, as well as a mark reading/decoding scheme. The teachings of this invention are multi-faceted, and encompass a method of printing encoded information on an item, such as fluorescent bar codes, formed of a series of marks to generate a unique identification number or indicia, as well as a reader system for reading the applied encoded information. The reader system includes an illumination source that excites the fluorescent marks in combination with a color sensitive device, such as a camera, which can be configured so as to be "blind" to the illumination wavelength but which can discern characteristics such as the fluorescence color and the order of the fluorescent marks.

In the preferred embodiment the marks form multi-dimensional wavelength-enabled coding schemes. The marks can be overlayed one upon another and/or they can contain one or more key regions having at least one predetermined spectral characteristic for providing information related at least to reading and/or decoding the marks.

A method is disclosed for encoding information onto an article, and includes (a) expressing the information as, for example, a multi-digit number; and, (b) encoding the information as a plurality of regions, marks, or bars that are disposed using a predetermined code scheme. Each region emits one of a plurality of predetermined wavelengths to collectively establish a set of wavelengths. The method further includes (c) including a key region for at least enabling remote identification of the encoded information. The method may apply the plurality of regions to the article by printing the plurality of regions onto a label using a plurality of different fluorescent inks, and then affixing the label to the article, such as by a thermal process.

To readout the encoded information, the method further includes (d) illuminating the plurality of regions with excitation light; (e) detecting a plurality of resulting wavelength emissions from the plurality of regions; and (f) decoding the information from the plurality of resulting wavelength emissions.

The article can be identified from the decoded information, and a future path that the article takes can be controlled based on the decoded information. As an example, a controller can select a type of washing that the article will receive, and/or a storage location for the article can be determined, based on the decoded information. As another example, a mail piece may be sorted for distribution based upon decoded address information.

BRIEF DESCRIPTION OF THE DRAWINGS

The above set forth and other features of the invention are made more apparent in the ensuing Detailed Description of the Invention when read in conjunction with the attached Drawings, wherein:

FIG. 1A is a top view of an exemplary embodiment of a label having a plurality of different fluorescent regions arranged in a predetermined code scheme for encoding information about an article to which the label will be affixed; FIG. 1B is an illustration of an embodiment of a multi-layer arrangement similar to that shown in FIG. 1A; FIG. 1C is an illustration of a two dimensional array involving vertically and horizontally distributed regions; FIG. 1D is an illustration of a two dimensional array arranged to be readout in a serpentine fashion; and, FIG. 1E is an illustration of a two-dimensional array where wavelength shifting occurs during readout.

DETAILED DESCRIPTION OF THE INVENTION

In accordance with aspects of this invention, a plurality of regions are applied to an article in order to form a mark that represents encoded information. Included with the plurality of regions is at least one key region that supplies the readout process with at least one characteristic related to the plurality of regions. The plurality of regions, and the key region, are formed of materials that emit a predetermined set of wavelengths under proper illumination. In preferred embodiments, fluorescent ink is used to form the plurality of regions and the at least one key region. The fluorescent ink may be applied using known techniques.

In preferred embodiments, key regions are characterized by wavelength emissions that are distinct from the wavelength emissions of the plurality of regions. The key region (s) carries additional information that relates to the encoded information. In some embodiments, a key region is signified by aspects other than unique wavelength emission, such as, for example, size or shape that is relatively distinct from the regions contained in the plurality of regions. In some embodiments, the key region may provide additional information that relates to the encoded information, and additionally carry portions of the encoded information.

Figure 1A:
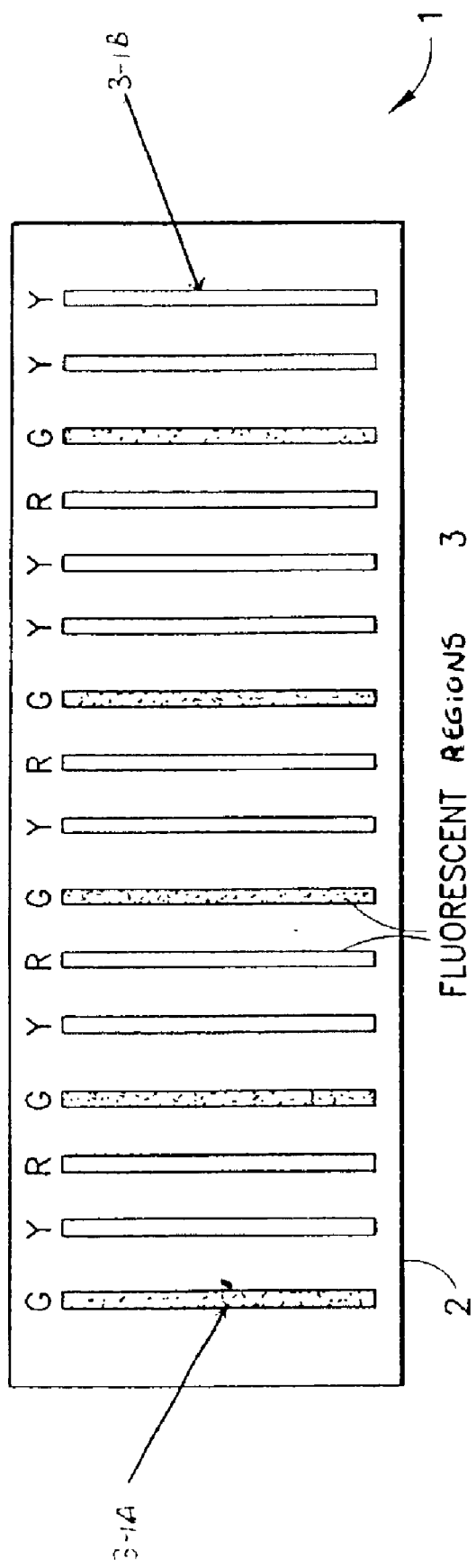
FIG. 1A–D, collectively referred to herein as FIG. 1, are views of exemplary embodiments of a label having a plurality of different fluorescent regions arranged using a predetermined code scheme for coding of information.

FIG. 1A depicts an embodiment of a marking for an exemplary identification and/or sorting application. In this exemplary embodiment, a plurality of regions 3 are applied using a standard impact printing technology using a fluorescent ink. In other embodiments, the plurality of regions 3 are applied using, for example, ink jet printing, screening, sublimation, or stamping. As such, any number of techniques for applying the marks can be used, and as employed herein such techniques are generally referred to as "printing." Included with the plurality of regions 3, is at least one key region 3-1A, and 3-1B.

Application of the Ink

In general, an applied fluorescent ink may be comprised of plastic fluorescent pigment and a phthalate ester plasticizer carrier. In a presently preferred embodiment of a formulation for a fluorescent impact printing ink, the preferred impact ink formula is 40 g/100 ml of fluorescent pigment/phthalate plasticizer. The phthalate plasticizer is preferably diisononyl phthalate. Other combinations of phthalate plasticizers, such as dioctyl, dibutyl, diethyl, etc. phthalate may be used as well. The only requirement is that the resulting phthalate ester/pigment combination does not soften a plastic cartridge that contains the nylon impact printing ribbon. The presently preferred fluorescent pigment is a finely-ground thermoset plastic resin which contains a selected fluorescent dye (such as one of the rhodamines) cross-linked into the matrix. Other embodiments include organic or inorganic phosphorescent and fluorescent pigments that are not significantly degraded by the expected environment of use, such as but not limited to, an industrial laundering process.

Figure 8:
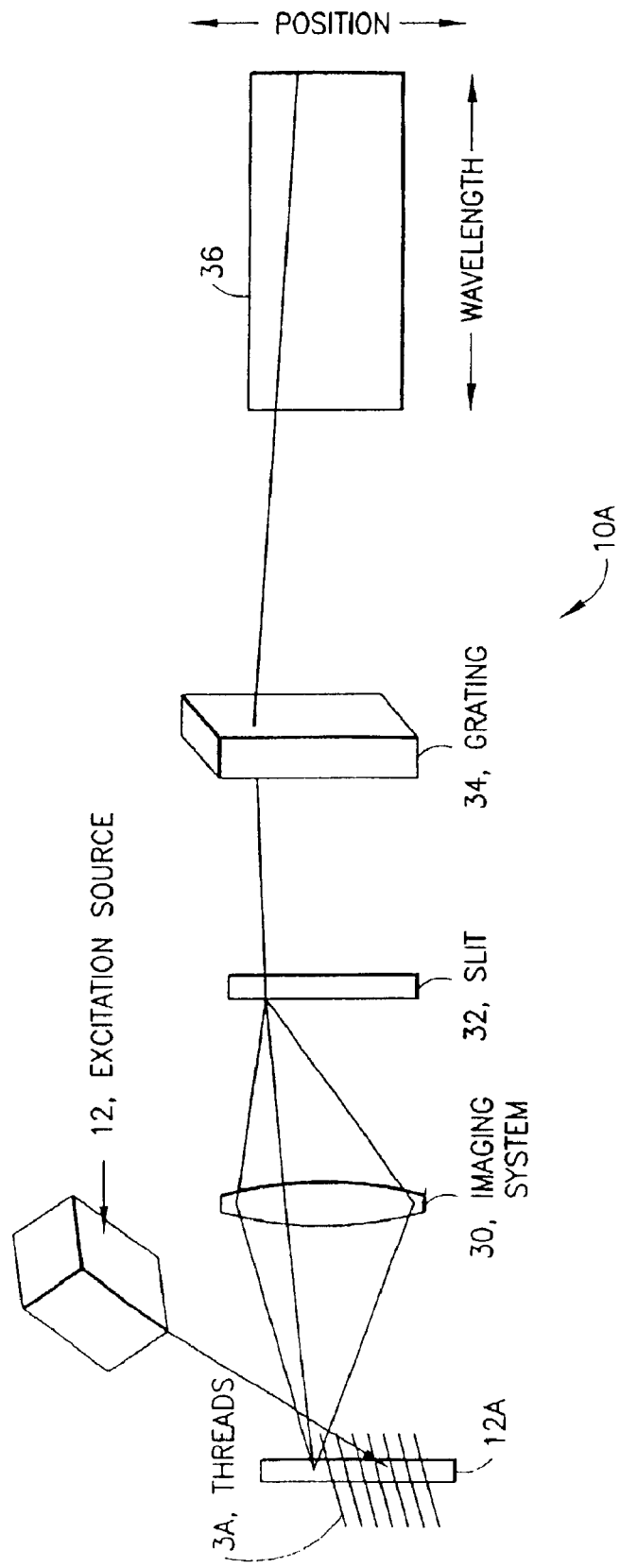
FIG. 8 depicts an alternative embodiment of a multi-spectral imaging system for reading the label in FIG. 1A.

The selected inks can be applied with standard commercial dot matrix print cartridges, wherein each cartridge may hold, for example, three distinct optically active inks (e.g., red, yellow, green), and (optionally) a conventional black ink for printing operator-readable information. The labels 1 can be printed on durable thermal seal stock 2 and attached with standard heat seal equipment. A printer 4 is shown in FIG. 8 for printing the labels 1, using a cartridge 5 that holds, for example, red, yellow and green fluorescent inks. In practice, the printer is driven by a suitable computer (not shown) having a program for generating numerical codes based on a desired coding technique (e.g., large items are assigned one group of numbers, small items another, etc.), and another or the same program for converting the generated number into a sequence of distinct wavelengths to be applied as fluorescent inks by the printer 4.

In other embodiments, the fluorescent regions 3 can be applied directly to the substrate article, or applied to a preexisting label previously affixed to the article, or applied to a removable (and possibly reusable) tag, or applied in any way that is suitable for the intended purpose of identifying, sorting and controlling the handling of the articles. The actual embodiment used, and manifestations thereof, may be dictated by various factors such as but not limited to, the needs of the user. For example, the marking of textiles in an industrial laundry may make use of direct marking on the material, whereas, addressing of mail pieces may call for use of a secondary label.

In further embodiments the foregoing teachings are applied to other objects for identification and sortation, including, by example and without limitation, mail pieces, packages, documents, financial instruments, boxes containing various types of goods, etc. One skilled in the art will recognize that a variety of applications may make use of this invention.

Example of Wavelength Encoding

In the example of FIG. 1A, a label 1 is comprised of a suitable label stock substrate 2 having a plurality (e.g., 16) vertical fluorescent bars 3 applied thereto. In this non-limiting example, three different fluorescent colors are used: green (G), yellow (Y) and red (R). Each color is assigned to a number. For example, green=1, yellow=2, and red=3. A code is formed by reading fluorescent colors from left to right as, for example, (green)(yellow)(yellow)=122 (base3).

The number of possible combinations for a given number of fluorescent marks N in therefore $3^N$. Thus, for three fluorescent colors and thirteen of the bars 3, the number of possible combinations is approximately 1.6 million.

The coding scheme of FIG. 1A is exemplary and non-limiting of the invention. That is, the teachings of this invention may used in combination with any predetermined code scheme suitable for a specific need. For example, coding schemes which require use of elements of varying proportion, distribution, size, shape, orientation or other aspect may be used. Although described herein in terms of certain embodiments, these embodiments are illustrative and non-limiting of the invention. As a further example of another embodiment, the linear array shown in FIG. 1A could make use of only one key region.

The exemplary embodiment of label 1 shown in FIG. 1A has 16 regions. Assuming a code based on 13 regions, this leaves room for three regions as key regions 3-1A, 3-1B for error correction purposes. The key regions 3-1A, 3-1B on either end can be reserved for checking the orientation of the label (so that the code is always reconstructed starting with, for example, the green region 3-1A and ending with the yellow region 3-1B). Also, any label that does not have a green region 3-1A on one end and yellow region 3-1B on the other end can be immediately rejected. Furthermore, one or many regions may be reserved for a modulo-M division check of the decoded word. This represents another level of error correction which can be built into the code. Many other error correction schemes can be used as well, as should occur to those skilled in the art.

In the exemplary embodiment of FIG. 1A, the coding scheme preferably uses a fixed, pre-determined number of regions. The codes are not weighted by the presence or absence (i.e. binary weighting) of a region in any particular position. All regions must be present in order to have a successful decode. This is in contrast to a standard fluorescent bar code, which uses a single fluorescent color and then determines the bit value, not by fluorescence color, but by the distance between the presence or absence of a color.

The plurality of regions 3 can be read by scanning in either direction (e.g., forward starting from a green key region 3-1A and ending with a yellow key region 3-1B, or reverse starting with yellow and ending with green), and the resulting code simply reversed if it is determined from the first region read that the plurality of regions 3 was read in the reverse direction. Preferably, the plurality of regions 3 are read in using the multi-spectral imaging techniques disclosed herein.

In other embodiments, only one key region 3-1A, 3-1B, is used for indication of a start or stop of a plurality of regions.

It should be noted that the label 1 can be coated after printing and thermal application to a garment or textile of interest. For example, an ultra-violet (UV) radiation curable clear coating may be applied to the label 1, at least so as to cover the plurality of regions or the bars 3, after printing and possibly heat sealing the label. The clear coating beneficially improves the wash characteristics. An example of such a coating resin is CraigCoat 1081 R, which is available from Craig Adhesives.

Aspects of Additional Embodiments

The teachings disclosed herein may employ any one or more of conventional coding schemes. For example, the teachings may be used with bar codes such as but not limited to, UPC-A, UPC-E, EAN-13, EAN-8, Code-128, and ITF (Interleaved 2-of-5), Code 39, and others. As used herein, these schemes, and any equivalent scheme are referred to as a "code scheme," or as a "predetermined code scheme." It is recognized that each of these code schemes provides a rule set describing the code, and aspects of the appearance of the code derived from the scheme.

Other aspects of a predetermined code scheme, as used herein, include consideration of the appearance of the regions. For example, the wavelengths used in the set of wavelengths, the size or shape of each of the regions, and other such factors.

Although referred to as being used for orientation and/or error checking, the additional regions, herein "key" regions, incorporated into the code scheme as disclosed herein, can be used for a variety of purposes. For example, one or more of the key regions may indicate the presence of a code, a certain orientation of a code, the identity of a code, or other aspects of a code. Furthermore, key regions 3-1A, 3-1B, may appear in a manner that is distinct and separate from the appearance of the code bearing (plurality of) regions 3. For example, in some embodiments, key regions 3-1A, 3-1B, may contain one or more wavelengths that are distinct from the wavelengths in the plurality of regions 3. The key regions 3-1A, 3-1B, may appear as a geometric figure, such as a triangle, or an ellipse which could be used for purposes such as an indication of code direction. An example is shown in FIG. 1D, where the key region 3-4A is a triangle indicating the direction of readout. In other embodiments, the key region 3-1A, 3-1B, 3-4A, could surround the encoded information, such as to encircle the encoded information.

In other embodiments, the key region 3-4B is used to indicate a change in the coding scheme used. In this embodiment, a portion of the information is encoded using a first coding scheme, and at least a second coding scheme is used to encode the remaining portion of the information. The remaining portion is distinguished from the first portion by use of the key region 3-4B. In this embodiment, at least one characteristic of the key region 3-4B is distinct from the encoded information in the first and remaining portion(s).

In another embodiment, the coding scheme used may be switched to at least a second coding scheme on the basis of position, without the aid of a key region 3-4B. For example, where the information is coded using alphanumeric characters, the first three characters may be encoded using a first coding scheme. The processing routine makes recognition of some aspect, such as the type of code scheme used, the appearance of a certain character or other aspect, and then switches code schemes for decoding of the remaining portion.

In further embodiments, aspects of a key region 3-4A, 3-4B, such as but not limited to, size, shape, or placement relative to other regions, may be varied so as to signify certain additional information regarding the encoded information. For example, a key region 3-4A within the plurality of regions 3-4 may have a certain feature such as being enlarged, offset, or of a distinct shape, where the certain region is included to indicate a switch in predetermined code schemes for decoding of the remaining portion. For instance, in one embodiment, the key region 3-4B provides a signal to the decoding system that the remaining portion of the plurality of regions 3-4 are to be decoded using a different set of wavelengths.

Figure 1B:
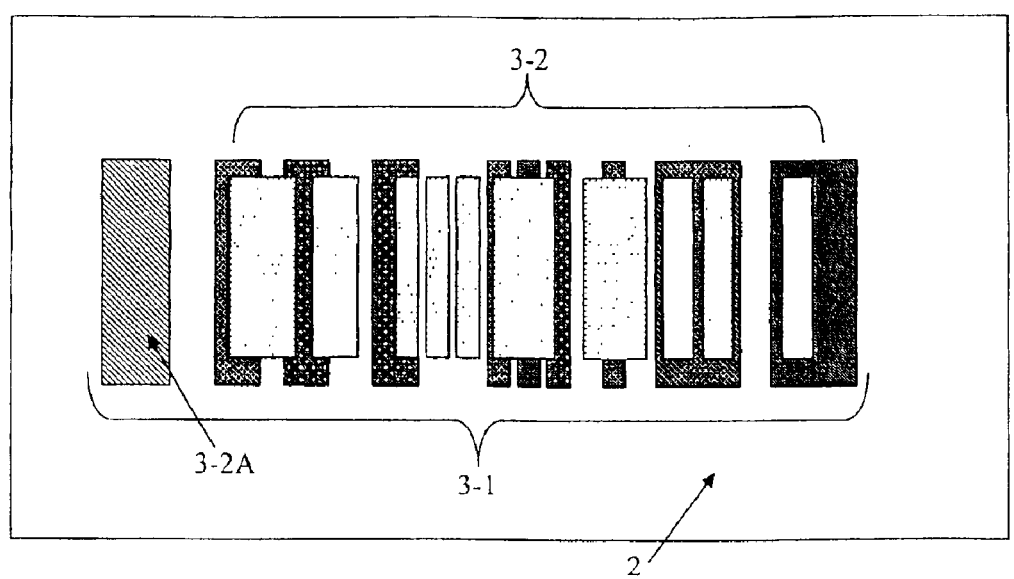
Figure 1C:
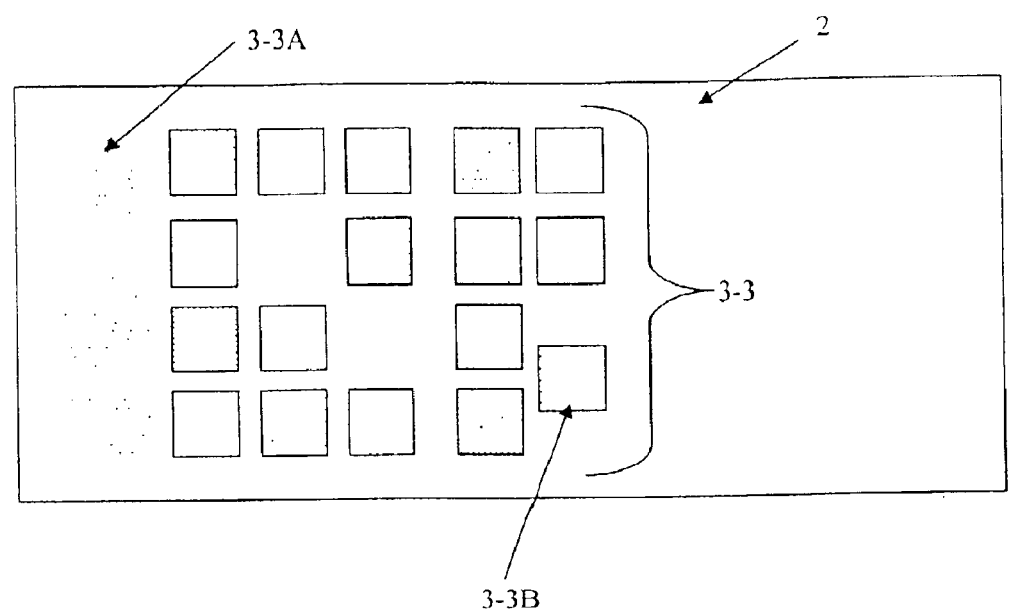
Figure 1D:
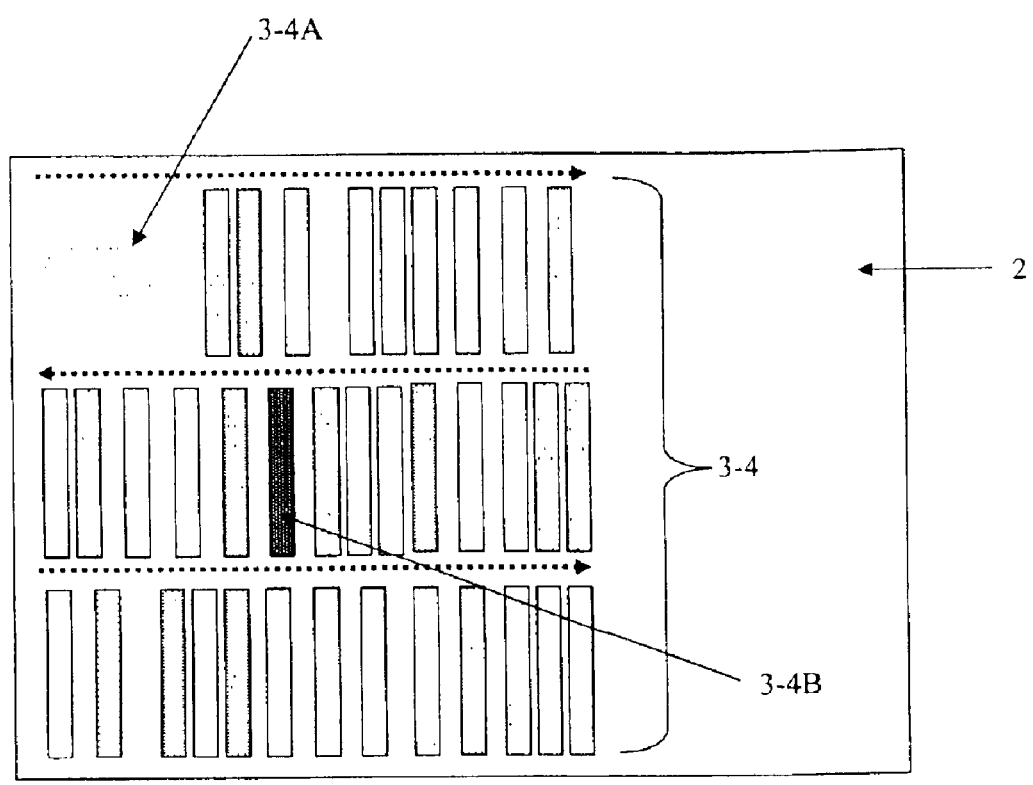
Figure 1E:
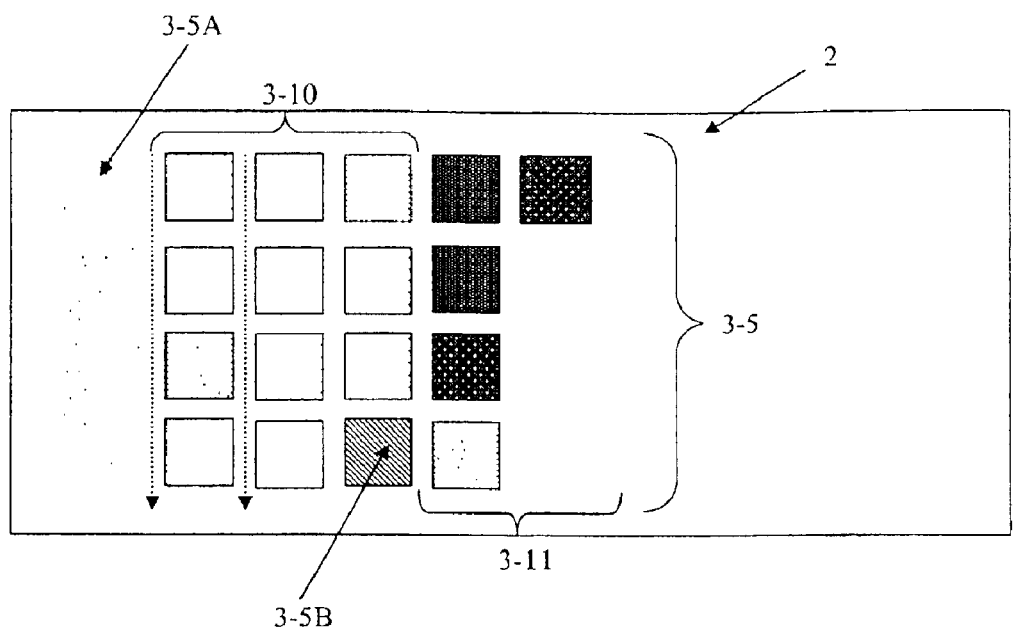

Another example of the use of a key region to provide indications regarding the encoded information is given in FIG. 1E. FIG. 1E shows a two-dimensional array where the plurality of regions 3-5 are arranged for vertical priority decoding. The vertical order of decoding is depicted by the downward pointed dashed arrows. During the decoding routine, the processor reads from the top of the vertical elements, starting at the first column next to the key region 3-5A, which is used to signify the start of the encoded information, as well as orientation. The processor processes the information contained in each of the regions in the first portion 3-10 one region at a time. The processor identifies unique wavelengths associated with a second key region 3-5B. In this embodiment, the second key region 3-5B indicates a shift in the predetermined code scheme. The processor accordingly makes an adjustment where it correlates wavelengths emitted by the remaining regions 3-11 with a different code scheme. The shift in wavelength assignments may be based upon the appearance of the key region 3-5B alone, or additionally, related to a change in the set of wavelengths used to encode the information. Additionally, the presence of a second key-region 3-5B may indicate a change in the decoding direction. For example, the direction may change to horizontally, as in FIG. 1D, for the remainder of the regions.

In other embodiments, any suitable data symbology may be encoded including letters of the alphabet, graphical symbols, musical notation, and the like.

Accordingly, one skilled in the art will recognize that an enormous variety of encoding schemes may be realized through use of this technique. This variety may make use of additional techniques, including but not limited to, incorporation of further coding schemes, and/or switching back and forth between codes.

Examples of Encoded Information

Further examples of aspects of this invention appear in FIG. 1B, FIG. 1C, FIG. 1D and FIG. 1E.

FIG. 1B shows a multi-layer arrangement, which is a variation of aspects of the embodiment shown in FIG. 1A. In FIG. 1B, a first plurality of regions 3-1 is disposed over a substrate 2. A second plurality of regions 3-2 is disposed over the first plurality of regions 3-1. The introduction of the second plurality of regions 3-2 does not interfere, or substantially interfere, with the ability to ascertain data from the first plurality of regions 3-1. For illustration purposes, FIG. 1B shows the first plurality of regions 3-1 and the second plurality of regions 3-2 as physically separated. In practice, however, the first plurality of regions 3-1 and the second plurality of regions 3-2 may be in direct contact with each other, as well as being in contact with the substrate 2.

In this embodiment, the first plurality of regions 3-1 and the second plurality of regions 3-2 may be encoded in a manner wherein certain aspects consistent with the foregoing description of the embodiment of FIG. 1A. For example, an arrangement of green, yellow and red bars may appear in the first plurality of regions 3-1, while an arrangement of blue, orange and magenta bars may appear in the second plurality of regions 3-2. Use of a multi-layer arrangement as shown in FIG. 1B can provide for additional variations that are not otherwise achieved in the embodiment shown in FIG. 1A. For example, the first plurality of regions 3-1 may contain a key region 3-2A used for error checking, as described in regard to FIG. 1A. Error checking key regions 3-2A may be alternatively or additionally incorporated into the second plurality of regions 3-2. With one of the plurality of regions free of error checking key regions 3-2A, additional data can therefore be carried by the scheme. For example, further consider the illustration of FIG. 1A. In this example, three regions are reserved for error checking and/or start and end codes out of an arrangement of 16 regions. Using a three color palette provides for $3^{13}$ possible codes, or 1,594,323 unique combinations. In contrast, if all 16 regions are used in the second plurality of regions 3-2, this provides for $3^{16}$ possible codes, or 43,046,721 unique combinations in the second plurality of regions 3-2.

This embodiment may further provide for use of a single start or end key region 3-2A. Other variations of this embodiment include varying of the space between regions in the first plurality of regions 3-1, and/or the second plurality of regions 3-2. Introduction of a dimensional relationship between the regions within each plurality, and use of dimensional variables can provide for further unique combinations over a scheme reliant solely upon wavelength encoding. Further variations include shifting wavelength assignments, coding schemes and other aspects in relation to the appearance of a key region 3-2A. For example, encountering key region 3-2A may indicate that a first predetermined code scheme is switched to a second predetermined code scheme for decoding the remainder of the encoded information.

In the embodiment shown in FIG. 1C, the plurality of regions 3-3 is applied over the substrate 2 in a vertical and horizontal pattern. That is, the encoded information is carried by a group of regions, each region exhibiting one of a set of predetermined wavelengths, and positioned as one element of a two-dimensional array which appears in relation to the start key region 3-3A. The format for the two dimensional array may be varied to provide for recording of varied size data records, or for other purposes. Variations of two dimensional arrays include, but are not limited to, one or more features, such as the use of a start key region 3-3A, variation of the number of wavelengths in a set of wavelengths, variation of the array size (in the example of FIG. 1C the array size is 5×4), variation of the number of elements appearing in a plurality of regions 3-3 (in the example of FIG. 1C the number of elements is 17), and inclusion of key regions for error checking. Wavelength reassignments may also occur within the two dimensional array, an example of which is reviewed in greater detail with regard to FIG. 1E.

The array need not be regular as evidenced by the key region 3-3B, which is shifted vertically with respect to the other regions 3-3. The shift could further be useful for additional coding of information into the array 3-3. Such information could indicate an internal aspect of the coding scheme, such as a shift in coding schemes, or be a part of the coding scheme, and have relevance to the content of the encoded information. In further embodiments, the key region 3-3B may be signified by having a unique appearance, such as a smaller or larger size than other regions, having a unique shape or other characteristic.

FIG. 1D provides an illustration of a further arrangement of the coding sequence using the teachings of this invention. In FIG. 1D, a plurality of regions 3-4 appears in a sequence that commences after a key region 3-4A indicating a start of a plurality of regions 3-4. The encoded information progresses in a serpentine style, where, in the exemplary code of FIG. 1D, the data is read row by row in a predetermined fashion as shown by the arrows. The key region 3-4B may indicate a change in the code scheme used, provide for an error check of the readout process, be used in combination with key region 3-4A for orientation, or for other purposes. FIG. 1E, as described above, features similar aspects of the invention.

Advantages of the incorporation of the key region 3-1A, 3-1B, 3-2A, 3-3A, 3-3B, 3-4A, 3-4B, 3-5A, 3-5B as disclosed herein includes, but are not limited to, the ability to remotely identify codes applied to an article. This provides for greater flexibility than available in coding applications that require fixed geometry, surface scans, or juxtaposition to a detector. Appropriately, the key region 3-1A, 3-1B, 3-2A, 3-3A, 3-3B, 3-4A, 3-4B, 3-5A, 3-5B maybe advantageously formed of inks such as the inks disclosed herein.

Exemplary Multi-Spectral Imaging System

Figure 2:
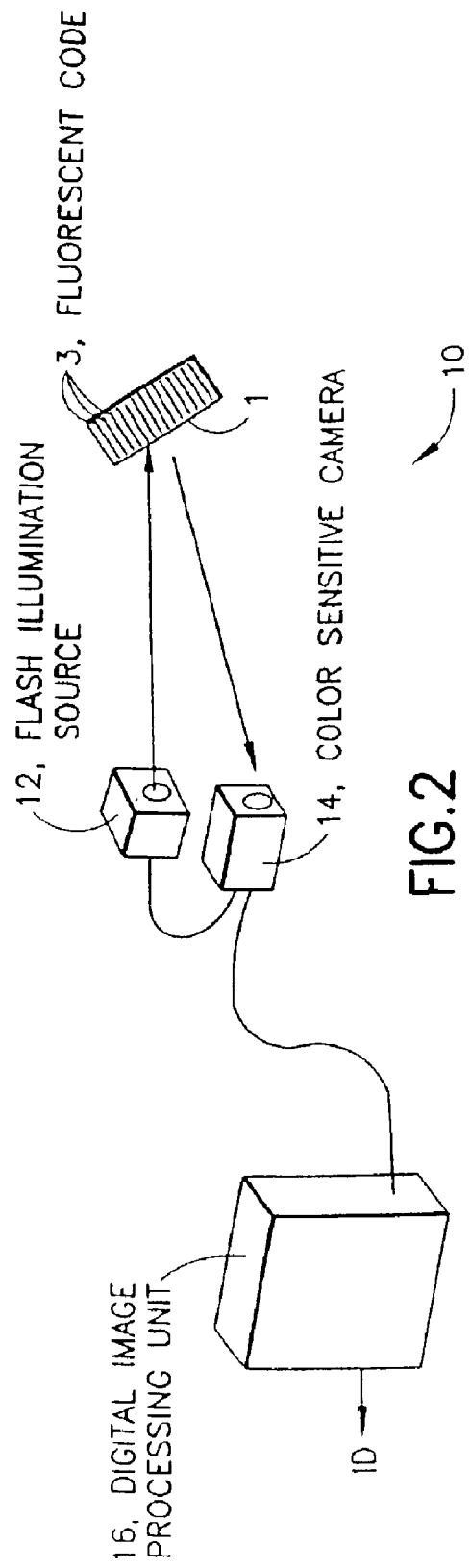
FIG. 2 is a block diagram of a multi-spectral imager system in accordance with this invention.

A preferred embodiment of a multi-spectral imager, also referred to as a reader system 10, is shown in FIG. 2. The reader system 10 includes three major components, which are an illumination unit or source 12 to excite the fluorescence found in the regions 3 on the label 1, a synchronized color sensitive imaging system 14 to obtain image data that includes the label 1, and a digital image processing unit 16 for processing the image data.

To read the label 1 the reader system 10 operates as follows. First, the illumination source 12 is activated. The illumination source 12 may comprise, by example, a Xenon flash-lamp with a short-pass filter, or a light-emitting diode, or a laser, or an incandescent bulb, or even appropriately filtered sunlight. The output light excites the fluorescent regions 3 in the label 1, and the fluorescent emissions are detected by the color sensitive camera unit 14.

Figure 3:
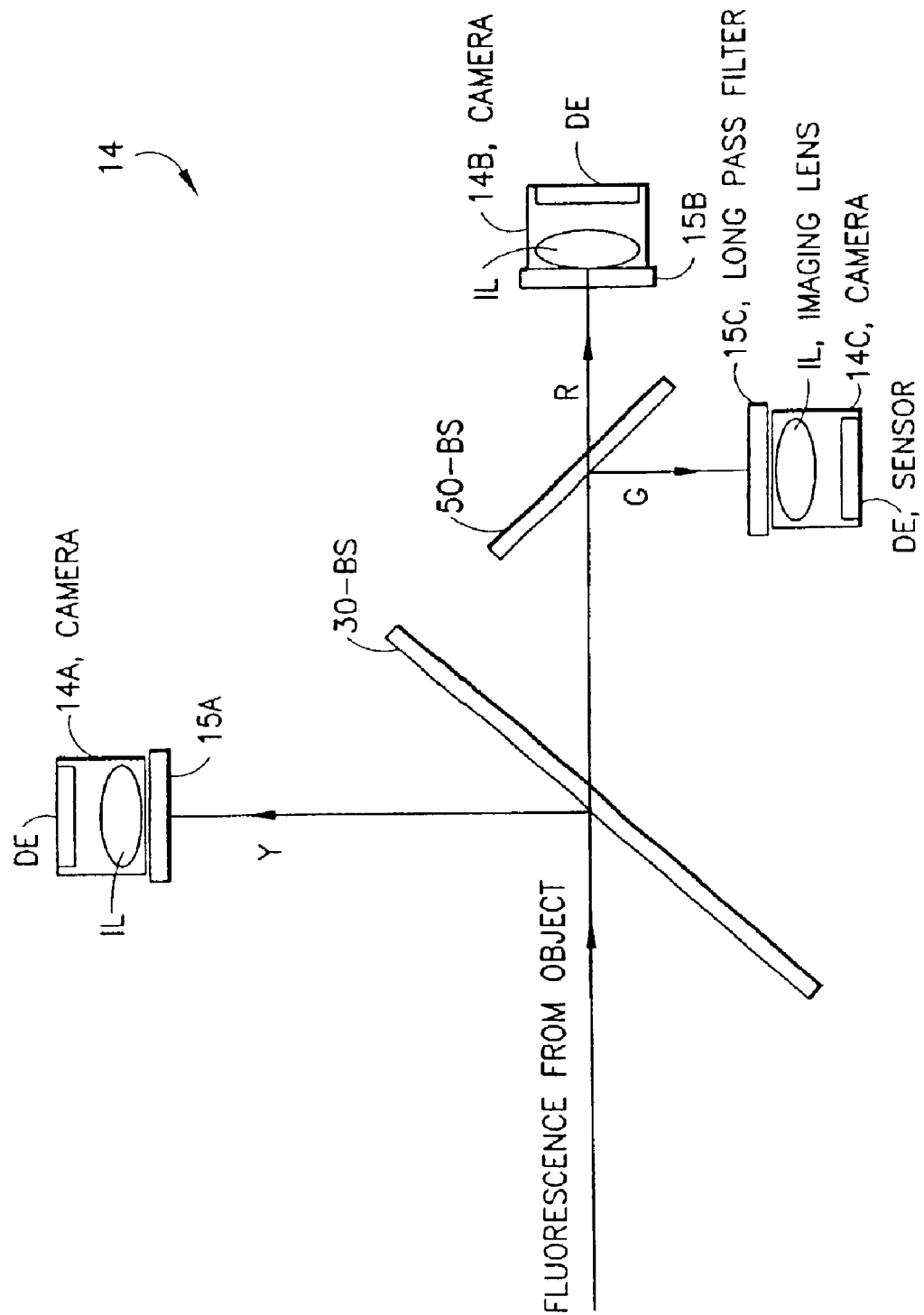
FIG. 3 is a block diagram of one embodiment of a color sensitive camera found in the system of FIG. 2.

An example of a suitable color imaging system for the camera 14 is shown in FIG. 3. A plurality of beam splitters, such as a 30% beam splitter (30-BS) and a 50% beam splitter (50-BS) divide the fluorescence arriving from the label 1 into a plurality of color channels, each of which contains a color-selective imager. In the illustrated embodiment, individual ones of three cameras 14A, 14B and 14C have a different filter 15A, 15B and 15C, respectively, over the detector element (DE) such that the illumination wavelength is blocked and the fluorescent color bands are let through, by varying amounts depending on the fluorescence color, onto the detector element. The light impinging on the detector element (DE) can be focused by an imaging lens (IL).

In this example, the camera unit 14 includes the three separate CCD arrays 14A–14C, each with a different long-pass filter 15A–15C. Long-pass filters are preferred because they are significantly less expensive than band-pass filters, and have other advantages which are detailed below in the decoding algorithm. However, band-pass and other types of filters can be used as well.

In general, the reader 14 may comprise a color sensitive CCD camera, a color sensitive CMOS camera, or a combination of two or more grayscale cameras with appropriate filters. The preferred data format from a color sensitive camera is YUV, since this format allows fast separation of the luma component and, therefore, fast spatial location of the imaged fluorescent marks or regions 3.

Figure 4:
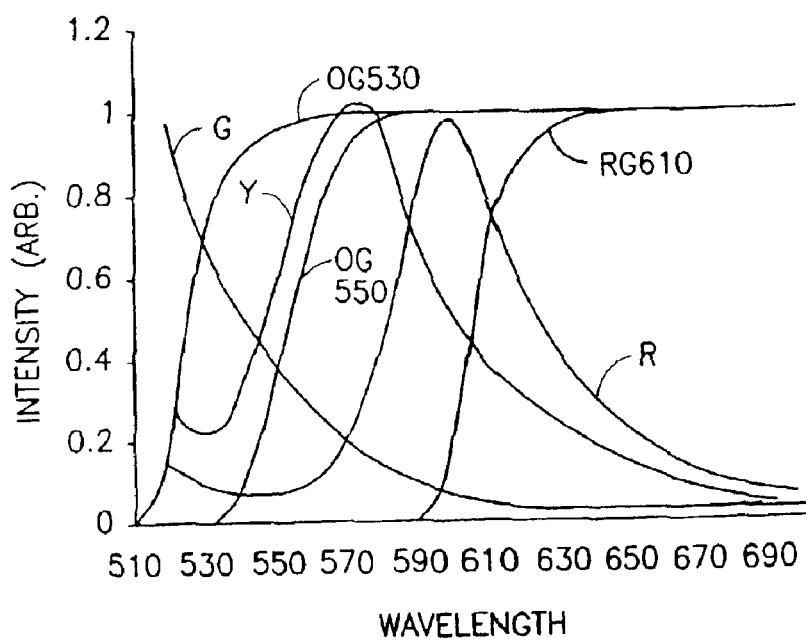
FIG. 4 is a graph illustrating exemplary optical filter responses and fluorescence data.
Figure 5:
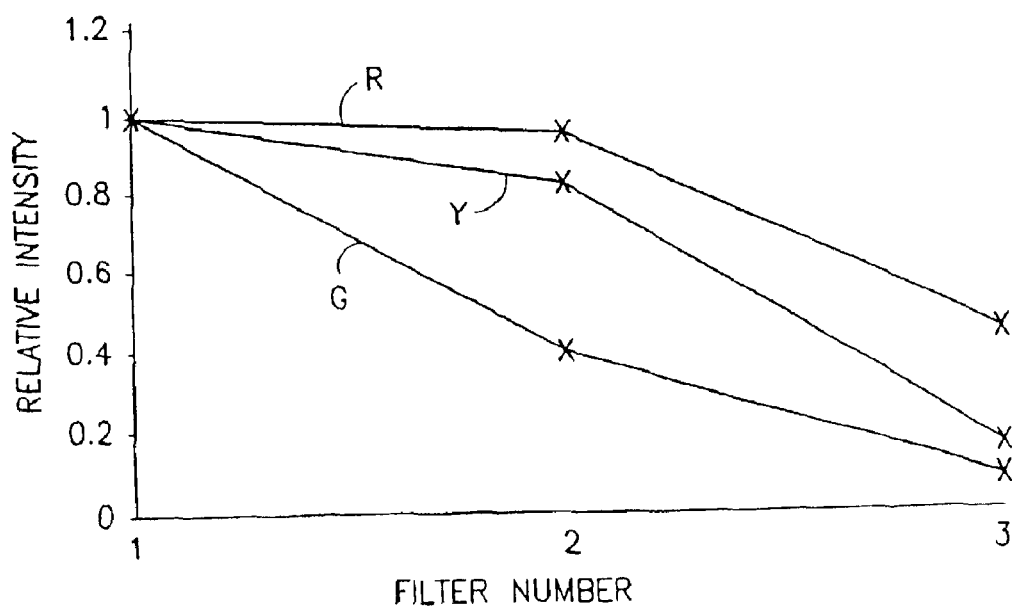
FIG. 5 is a graph illustrating exemplary spectral data for each image pixel that detects with a green, yellow or red bar on the label shown in FIG. 1A.

Assume, for example, the long-pass filter responses shown in FIG. 4 (OG530, OG550 and RG610 are specific long-pass filter types, wherein the number designates the wavelength where 50% transmission occurs), and also assume the exemplary fluorescence signals for R, G and Y. Then, the spectral data shown in FIG. 5 (having three points for each pixel) can be decoded by, for example, a radial-basis-function neural network, or some other type of suitable decoder, as will be discussed in further detail below.

Reader 14 systems, such as the ones disclosed herein comprising a CCD camera, or a color sensitive CMOS camera, can further provide for the advantageous embodiments, such as those disclosed in FIG. 1A, FIG. 1B, FIG. 1C and FIG. 1D. In these embodiments, the camera can be used to obtain a complete image of the plurality of regions (code), without the requirements incumbent upon or limitations of scanning techniques. In these embodiments, subsequent processing of images makes use of key codes, such as the start key regions 3-1A, 3-3A, 3-4A, to enter into a predetermined method or routine for processing the associated image. That is, the recognition of a key region 3-4A indicating a start of a plurality of regions may initiate decoding based upon a certain code layout, such as but not limited to those described herein. In an example, the routine counts N number of signals in a predetermined direction from the key region 3-4A of known orientation, then looks down a given distance for a next series, counts N signals, and so on, until the routine is complete.

In another example, such as in the case of FIG. 1C, the start key region 3-3A is used to set up the recognition and reading of the encoded information. In this embodiment, wavelengths used in the start key region 3-3A are easily recognized by the processor used to examine the image taken by a CCD camera. Once recognized, the processor makes reference to a data table. Upon comparison to the data table which contains wavelength information for start key regions 3-3A, further preliminary information is obtained. For instance, the data table contains and provides information, such as but not limited to, the correlation of a given wavelength to two dimensional array having 4 vertical elements by 5 horizontal elements. The processor then makes further adjustments using the size of the start key region 3-3A as it appears in the image, thereby effectively calibrating for the geometry of the individual image. The processor, having also derived wavelength information regarding the embodiment from the data table, further scans for the associated wavelengths. The wavelengths are recognized by the processor in a secondary recognition task. This secondary recognition task further provides the processor with orientation information. Using the geometry information so collected or calculated, and other information as necessary, the processor is then equipped with information adequate for decoding of the coding scheme. Decoding is completed in accordance with techniques described herein.

Advantageous aspects of the use of the combination of such reader 14 systems and processing systems in combination with the embodiments disclosed herein, include, but are not limited to, the ability to perform continuous imaging and processing of a production line (limited only by aspects such as camera speed and processing power). Therefore, one skilled in the art will recognize that the teachings herein, in addition to addressing other needs, are supportive of high throughput systems.

The teachings of this invention provide a number of advantages and novel features. Examples of some of the advantages are provided.

For example, in some embodiments, such as some textile sorting applications, only the order of the bars 3 is relevant for decoding the label 1. Since the actual position is not important in these embodiments, distortions of the label 1 due to wrinkling of the fabric, etc., does not change the decoded output.

Another advantage recognizes that since the cameras 14A–14C can be looking in color bands that naturally show a low background fluorescence (unlike the case where ultraviolet illumination is used) the camera can be configured so that only wavelengths associated with the code itself appears in the field of view of the camera. This allows for a much faster location of the encoded information within an acquired image.

A further advantage is that even those codes represented by very faded bars 3 can still be successfully read by increasing the illumination power of source 12 and/or the gain (sensitivity) of the cameras 14A–14C.

In other embodiments, the scheme provides for a significant number of data combinations, or a compact display of data. Shifting of coding schemes, and other techniques disclosed herein, may be used to further provide for security of encoded information.

Further advantages include, but are not limited to, ability to decode information using remote imaging of articles in a high throughput sorting environment.

Processing Encoded Information

Figure 6:
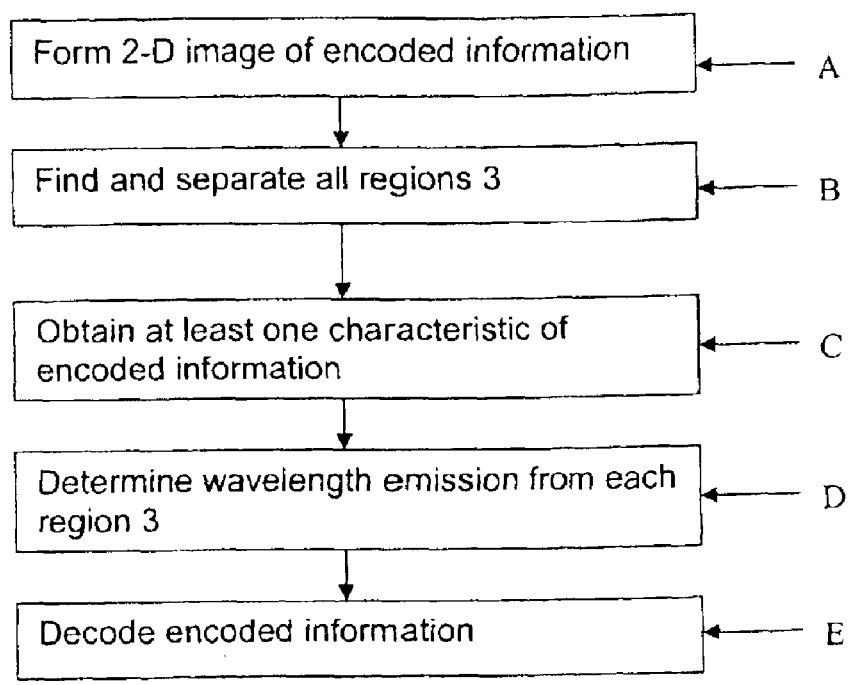
FIG. 6 is a logic flow diagram of an image processing method in accordance with this invention.

In order to successfully read a code from a label 1 the image processing software that executes in the digital image processing unit 16 (FIG. 2) performs the following tasks, in a preferred embodiment, in near-real-time. Reference is also made to the logic flow diagram of FIG. 6.

At Block A the image processing software creates a two-dimensional image of the encoded information. At Block B, the algorithm locates and separates all of the region images, that is, the algorithm identifies and separate one from another individual one of the regions within the encoded information. The image processing software identifies the at least one key region 3-1A, 3-1B, 3-2A, 3-3A, 3-3B, 3-4A, 3-4B. In Block C, the processing software then seeks information on at least one characteristic of the encoded information on the basis of the key region information. For example, in one embodiment, the processing software makes reference to an informational table that correlates key region wavelength identity with a specific code scheme. In another embodiment, the processing software makes recognition of two key region wavelength emissions, thus providing for a determination of the orientation of the encoded information. In yet another embodiment, the processing software determines the dimensions of the key region wavelength emission, and calculates the proportionate image size of the encoded information. At Block D, the method determines the emission wavelength or color of each region 3, and at Block E, from the list of colors and the order of the bars 3, the algorithm decodes the information that was previously encoded into the encoded region of the label 1.

The first step (Block A) is preferably performed using a center-of-mass and eccentricity algorithm. In some embodiments, since the code appears in the image as a long rectangle, the label 1 can be located and oriented by first finding the center of mass of pixels above a certain threshold, and then by finding the orientation of the major axis around that center of mass. This allows multiple line scans to be taken of the pixel data across the plurality of regions in the direction of the major axis. A more sophisticated algorithm outlines and separates all bright areas appearing in the image, so that the need for the label to show all regions across a single line scan is eliminated. In this case, dots or any other shape could be used for each fluorescent region.

It should be noted that there is one important detail of the optical system that greatly simplifies the steps shown in Blocks A and B. That is, since the preferred type of filters 15A–15C are long-pass filters, the data in the shortest pass filter all look equally bright, i.e. the image appears to be an equalized gray-scale image, no matter what the fluorescence color of the each bar 3 happens to be. This would not be the case if band-pass filters were used. It is much simpler to locate and orient the code in this type of image, since one need not be concerned (at this stage) with the color information.

The use of long-pass filters, rather than band-pass filters, has a further advantage in the assembly of a multi-camera unit. If band-pass filters were used, the gray-scale image needed for code location and orientation would need to be synthesized from all three images, without a prior knowledge of where the code actually is in the field of view. If the synthetic color image is not perfectly registered in the space between arrays, the bars may not overlap one another and, therefore, can give false color information in the decoding step. If all bars can be precisely located in space, however, from one of the long pass images regardless of color, the need for perfect registration between arrays is relaxed. The precise location of a region is recorded in the first image and then the brightest part of that region can be found in successively filtered images using a very simple search procedure limited to a few pixels. This means that the mis-registration of the arrays can be corrected in software, and furthermore removes the need for micron-scale adjustment of the position and focusing of the arrays during the assembly step.

Once the line data containing the peak positions of the data (corresponding to each region 3) is located, the spatial position of each peak is discovered (Block B). The peak finding algorithm is preferably based on a pattern recognition algorithm which looks for a characteristic four-point signature at the inflection points of the smoothed data. The peaks are decoded and then sorted according to which peaks appear most like a typical region (which can be predetermined). The first N highest-scoring peaks are then retained, where N is the number of bars one expects to see (e.g., 16 in the embodiment shown in FIG. 1A). If less than N bars are found in the image, an error condition is indicated.

In Block C, the processor makes reference to external data to obtain at least one characteristic of the encoded information 3-4. For example, the key region information may indirectly provide information such as, but not limited to, the identity of the code scheme(s), the wavelength set of the plurality of regions 3, and other such information. Furthermore, the key region 3-4A, 3-4B may be used to provide information directly to the processor, such as orientation information. In one such embodiment, the processor determines relative positioning of the two key regions 3-4A, 3-4B, and accordingly determines the orientation of the encoded information 3-4.

Finally, once the regions are located the color information of each region is obtained (Block D). The color information contains, for an exemplary three color palette, three points per pixel. These three points are then run through a radial basis function neural network (which can be software running on the processing unit 16) to determine the color. The data in the pre-trained neural network is grouped, for example, according to number of wash cycles or central distribution location. This takes into account any overall data shift in the labels due to problems arising from wear, fading, etc.

Important features of the optically coded labels 1 include, for example: they can be thermally applied using heat seal backing (or simply stitched on as well), they exhibit durability that may outlast the article lifetime for many articles to which they are affixed, a high read accuracy (99%) is obtained, they also exhibit high readability under soiled conditions, and finally, reliable reads have been achieved at conveyor speeds of up to 10,000 items/hour.

Advantages of the optically coded labels include, for example, that they do not rely on a contrast-based technology, and soiling of the label has a greatly reduced effect on readability. Furthermore, since the coding is done by wavelength, and can be read using CCD, CMOS the labels can be read in any orientation. Furthermore, since the labels can be read using a non-scanning technology, an exemplary 12 inch field of view of the color sensitive camera 14 allows greater latitude when the items are in a production environment, such as on a conveyor, or, in the case of garments, when on hangers, which can exhibit swaying motions while conveyed past a camera unit 14 mounted next to the conveyor.

A code capacity of an exemplary multi-spectral imaging system operating in accordance with the present invention can be defined by the following:

Number of codes $N_c = T^N$, where

T=number of unique spectral signals (e.g., red, green, yellow), and

N=number of spatial positions.

As an example, for T=5 and N=10 (5 unique spectral signals in 10 positions), the total number of codes $N_c = 10^8$.

Exemplary Application

Figure 7:
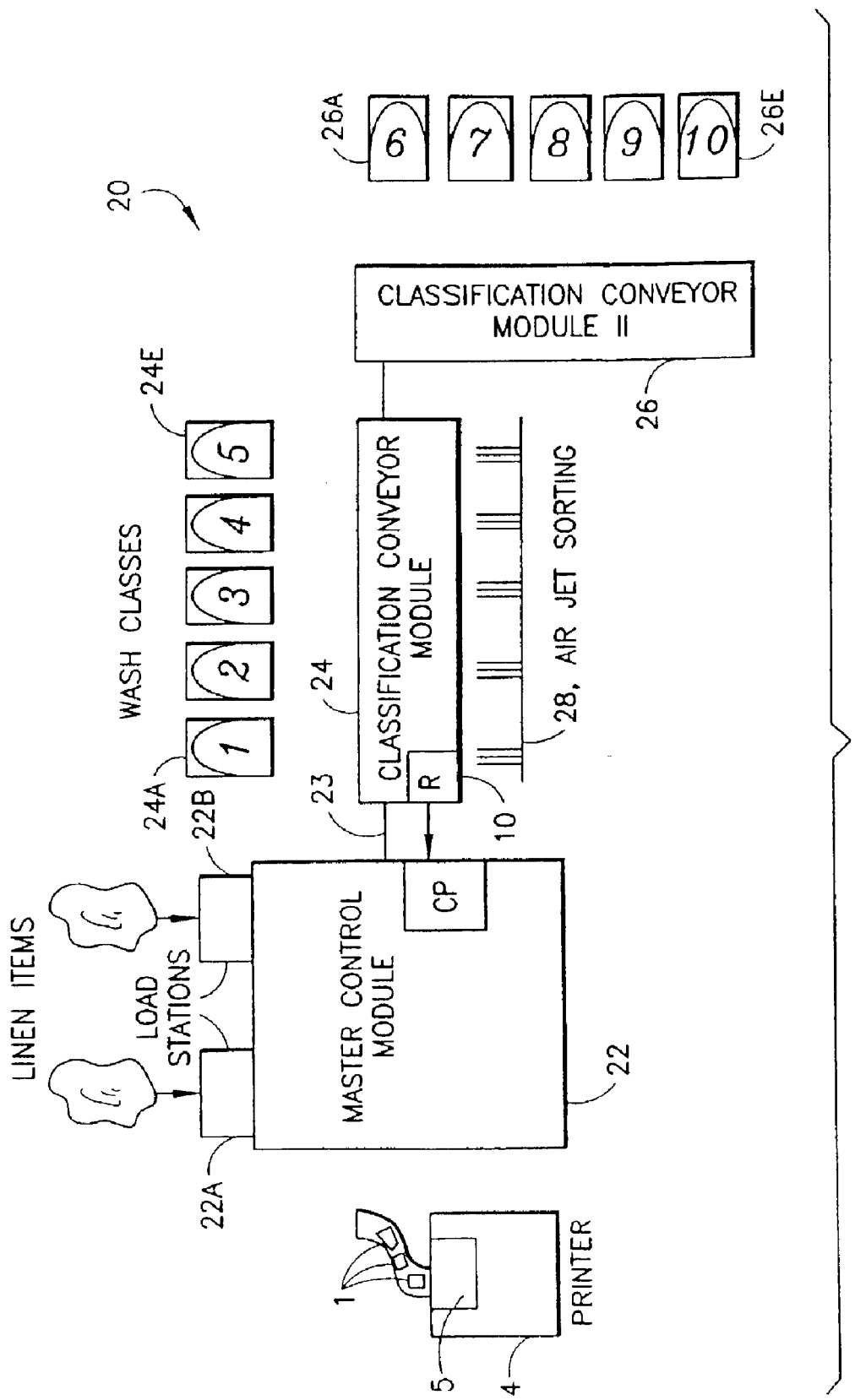
FIG. 7 is a block diagram of an exemplary commercial textile/garment sorting, washing and storage system that is constructed and operated in accordance with embodiments of this invention.

Referring to FIG. 7, an identification and sorting system 20 in accordance with the present invention includes a master control unit or module 22 which is connected to one or more material transport unit modules, shown as a first classification conveyor module 24 and second classification conveyor module 26. Generally, the soiled unsorted linen and garment items are loaded by various means such as laundry chutes or conveyors (load stations 22A and 22B) into the master control module 22. The soiled and unsorted items are then transported by the one or more conveyor modules 24 and 26 first to wash stations 24A, 24B, etc., via air jet sorting units 28, and then to storage depository locations 26A, 26B, etc. The wash stations 24A–24E may be segregated to wash appropriate wash classes of the linen and garment items. The storage depository locations 26A–26E are segregated so that only a specific type of linen or garment item is stored at each location. The system 20 includes one or more of the above described multi-spectral imagers or reader systems 10, as shown in FIG. 2, which are capable of high speed reading of labels 1 or similar tags or materials in the linen and garment items. The labels 1 and/or tags are encoded for identification purposes with the photonically active materials discussed above. The reader(s) 10 may be located in the classification conveyor modules 24 and 26, or at an interface 23 between the master control module 22 and the classification conveyor modules 24 and 26. The reader(s) 10 are connected to a central processor (CP) in the master control module 22. The central processor uses data from the reader(s) 10 to control the classification conveyor modules 24 and 26 to automatically sort the linen and garment items for washing in the corresponding wash stations 24A–24E, and then for storage in the appropriate storage location 26A–26E. The system 20 can also optionally be operated with non-photonically coded inventory, such as by indicating with a switch closure to the master control module 22 that the conveyor(s) 24,26 are to be programmed for conventional manual classification. A hybrid system operation can also be employed, wherein, by example, the item classification is done manually, but inventory count and wash sorting is done using the information encoded in the labels 1.

The linen and garment items used with the system 20 of the present invention include the labels 1, threads or yarn with photonically active materials. The photonically active materials are encoded in the labels 1, threads or yarn to identify the linen and garment items by, for example, wash type and storage category. The encoded wash types and categories are recognized by the central processing unit when read by a reader 10 in the system 20.

The linen and garment items used with the system 20 of the present invention preferably employ the labels 1 which leverage the signal-to-noise advantages of light emission with the high code densities of bar coding. Each label 1 contains, as described above, a series of lines or bars 3 that emit one of several wavelengths to represent a unique number. Since the label 1 emits wavelengths of light, rather than reflecting incoming light, as with bar codes, they are highly tolerant of soiling and wash fading.

The labels 1 of this invention need not depend on the thickness of the printed lines or bars as is the case in bar code technology. The encoded information of the label 1 can be contained in the wavelength domain, and in some embodiments, in the spatial sequence of wavelengths. Any of the marking and coding schemes shown in the FIGS. 1A through 1E and described above can be used on or within a label 1. As a result, labels 1 can be adapted to provide significantly more robust and simple code patterns than found in conventional bar coding techniques. This attribute allows the labels 1 to be read accurately in any orientation even with severe bending, distortion, or other problems often encountered with garments in high production laundries. The labels 1 may also be read over a wider field of view (e.g., 20 cm by 15 cm) than bar codes, since the requirement to resolve narrow line features need not exist.

FIG. 8 illustrates a further embodiment of a multi-spectral reader system 10A, wherein fluorescent yarn or fluorescent threads 3A or the regions 3 are illuminated within an area 12A by the excitation source 12, and the resulting fluorescent emissions are collected by an imaging system 30, passed through a slit 32 to a grating 34 or some other suitable wavelength resolving device, to produce a spectrum 36. The spectrum 36 contains the encoded information from the threads 3A or bars 3, and the information is expressed as a function of both wavelength and position. The spectrum 36 could be converted to pixels by a two dimensional CCD detector or other suitable means, and the locations of those pixels above a threshold value converted to the encoded information by using a suitably trained neural network or some other image processing technique.

Thus, while the invention has been particularly shown and described with respect to preferred embodiments thereof, it will be understood by those skilled in the art that changes in form and details maybe made therein without departing from the scope of the invention.

What is claimed is:

1. A method for encoding information onto an article, the method comprising:
    encoding information in accordance with at least one predetermined code scheme;
    disposing the encoded information onto said article as a plurality of regions wherein each of said regions emits one of a plurality of predetermined wavelengths comprising a first set of wavelengths; and
    applying at least partially over said plurality of regions at least one plurality of second regions that encodes information in accordance with the same or a different predetermined code scheme, wherein each of said second regions emits one of a plurality of predetermined wavelengths comprising a second set of wavelengths, and wherein at least one key region emits a predetermined wavelength for indicating at least one characteristic of said encoded information.

2. The method of claim 1, where the characteristic indicates orientation of the plurality of regions.

3. The method of claim 1, where the characteristic indicates a start of the plurality of regions.

4. The method of claim 1, where the characteristic indicates an end of the plurality of regions.

5. The method of claim 1, where the characteristic indicates the identity of the predetermined code scheme.

6. The method of claim 1, where the characteristic indicates a shift in the identity of the predetermined code scheme.

7. The method of claim 1, where the characteristic indicates a shift in the wavelength set used by at least one of the first set of wavelengths and the second set of wavelengths.

8. The method of claim 1, wherein the at least one key region is characterized by a unique appearance relative to other regions.

9. The method as in claim 1, where disposing comprises applying at least one of the plurality of regions and the key region to the article by printing using a plurality of different fluorescent inks.

10. The method as in claim 1, where disposing comprises applying at least one of the plurality of regions and the key region to the article by printing onto a label using a plurality of different fluorescent inks, and then affixing the label to the article.

11. A method for encoding information onto an article, the method comprising:
    encoding information in accordance with at least one predetermined code scheme;
    disposing the encoded information onto said article as a plurality of regions arranged in a two dimensional array wherein each of said regions emits one of a plurality of predetermined wavelengths comprising a set of wavelengths;
    including with said encoded information at least one key region that emits a predetermined wavelength for indicating at least one characteristic of said encoded information.

12. The method of claim 11, where the characteristic indicates orientation of the plurality of regions.

13. The method of claim 11, where the characteristic indicates a start of the plurality of regions.

14. The method of claim 11, where the characteristic indicates an end of the plurality of regions.

15. The method of claim 11, where the characteristic indicates the identity of the predetermined code scheme.

16. The method of claim 11, where the characteristic indicates a shift in the identity of the predetermined code scheme.

17. The method of claim 11, where the characteristic indicates a shift in the wavelength set used by the set of wavelengths.

18. The method of claim 11, wherein the at least one key region is characterized by a unique appearance relative to other regions.

19. The method as in claim 11, where disposing comprises applying at least one of the plurality of regions and the key region to the article by printing using a plurality of different fluorescent inks.

20. The method as in claim 11, where disposing comprises applying at least one of the plurality of regions and the key region to the article by printing onto a label using a plurality of different fluorescent inks, and then affixing the label to the article.

21. A method for encoding information onto an article, the method comprising:
    encoding information in accordance with at least one predetermined code scheme;
    disposing the encoded information onto said article as a plurality of regions arranged in a linear array wherein each of said regions emits one of a plurality of predetermined wavelengths comprising a first set of wavelengths; and,
    including with said encoded information a key region that emits a predetermined wavelength for indicating at least one characteristic of said encoded information.

22. The method of claim 21, where the characteristic indicates orientation of the plurality of regions.

23. The method of claim 21, where the characteristic indicates a start of the plurality of regions.

24. The method of claim 21, where the characteristic indicates an end of the plurality of regions.

25. The method of claim 21, where the characteristic indicates the identity of the predetermined code scheme.

26. The method of claim 21, where the characteristic indicates a shift in the identity of the predetermined code scheme.

27. The method of claim 21, where the characteristic indicates a shift in the wavelength set used by the set of wavelengths.

28. The method of claim 21, wherein the key region is characterized by a unique appearance relative to other regions.

29. The method as in claim 21, where disposing comprises applying at least one of the plurality of regions and the key region to the article by printing using a plurality of different fluorescent inks.

30. The method as in claim 21, where disposing comprises applying at least one of the plurality of regions and the key region to the article by printing onto a label using a plurality of different fluorescent inks, and then affixing the label to the article.

31. A marking for an article containing encoded information, the marking comprising:

information encoded in accordance with at least one predetermined code scheme;

the encoded information comprising a plurality of regions arranged in a linear array wherein each of said regions emits one of a plurality of predetermined wavelengths comprising a first set of wavelengths; and, a key region that emits a predetermined wavelength for indicating at least one characteristic of said encoded information, and wherein the characteristic indicates at least one of the orientation of the encoded information, the start of the encoded information, the end of the encoded information, the predetermined wavelengths, the predetermined code scheme, a shift in the predetermined code scheme and a shift in the set of wavelengths associated with the plurality of regions.

32. The marking of claim 31, comprising:

at least one plurality of second regions disposed in a predetermined code scheme at least partially over said plurality of regions, wherein each of said second regions emits one of a plurality of predetermined wavelengths comprising a second set of wavelengths; and, at least one key region in at least one of said plurality of regions and second regions.

33. The marking of claim 31, comprising: the encoded information as a plurality of regions that are arranged in a linear array.

34. The marking of claim 31, comprising: the encoded information as a plurality of regions that are arranged in a two dimensional array.

35. The marking of claim 31, wherein the at least one key region is characterized by a unique appearance relative to the other regions.

36. The marking as in claim 31, where at least one of the plurality of regions and the key region are printed using a plurality of different fluorescent inks.

* * * * *